March 21, 1933.  C. C. BROWN  1,902,540
WELL CONTROL DEVICE
Filed Feb. 19, 1932   2 Sheets-Sheet 1

Cicero C. Brown, Inventor

By Jesse R. Stone & Lester B. Clark
Attorneys

March 21, 1933.  C. C. BROWN  1,902,540
WELL CONTROL DEVICE
Filed Feb. 19, 1932  2 Sheets-Sheet 2

Cicero C. Brown  Inventor

Jesse R. Stone
&
Lester B. Clark
Attorneys

Patented Mar. 21, 1933

1,902,540

UNITED STATES PATENT OFFICE

CICERO C. BROWN, OF HOUSTON, TEXAS

WELL CONTROL DEVICE

Application filed February 19, 1932. Serial No. 593,993.

My invention relates to apparatus for controlling the flow of fluid from the well and is adapted for use particularly in deep well operations for oil and gas.

In wells in which the fluid issues from the well under considerable pressure accidents sometimes occur to the flow line, or the valves and fittings connected therewith are worn in use so that replacements of the said parts must be made during the flowing of the fluid therefrom. In order to do this it is necessary that the lines being operated upon must be closed off to allow the changes to be made. Various arrangements have been made for this purpose, the most common one being to pump the mud into the well so as to shut off the flow of the fluid until the connections have been made. This is a dangerous proceeding, leading sometimes to the loss of the well, and is to be avoided, if possible.

It is an object of my invention to provide a means for closing off the flow of fluid from the well, both through the casing and through the tubing or flow line.

It is desired to provide an apparatus whereby the flow from the well either from the casing or through the tubing may be obstructed as desired to allow operations to be made upon the flow lines connected therewith.

I also have as an object to provide a simple and economical structure which will perform the objects above set forth and which may be readily operated in use.

In the drawings herewith, Fig. 1 is a side view partly in elevation and partly in vertical section showing a well head equipped with my invention.

Figures 1, 2, 3, 4:
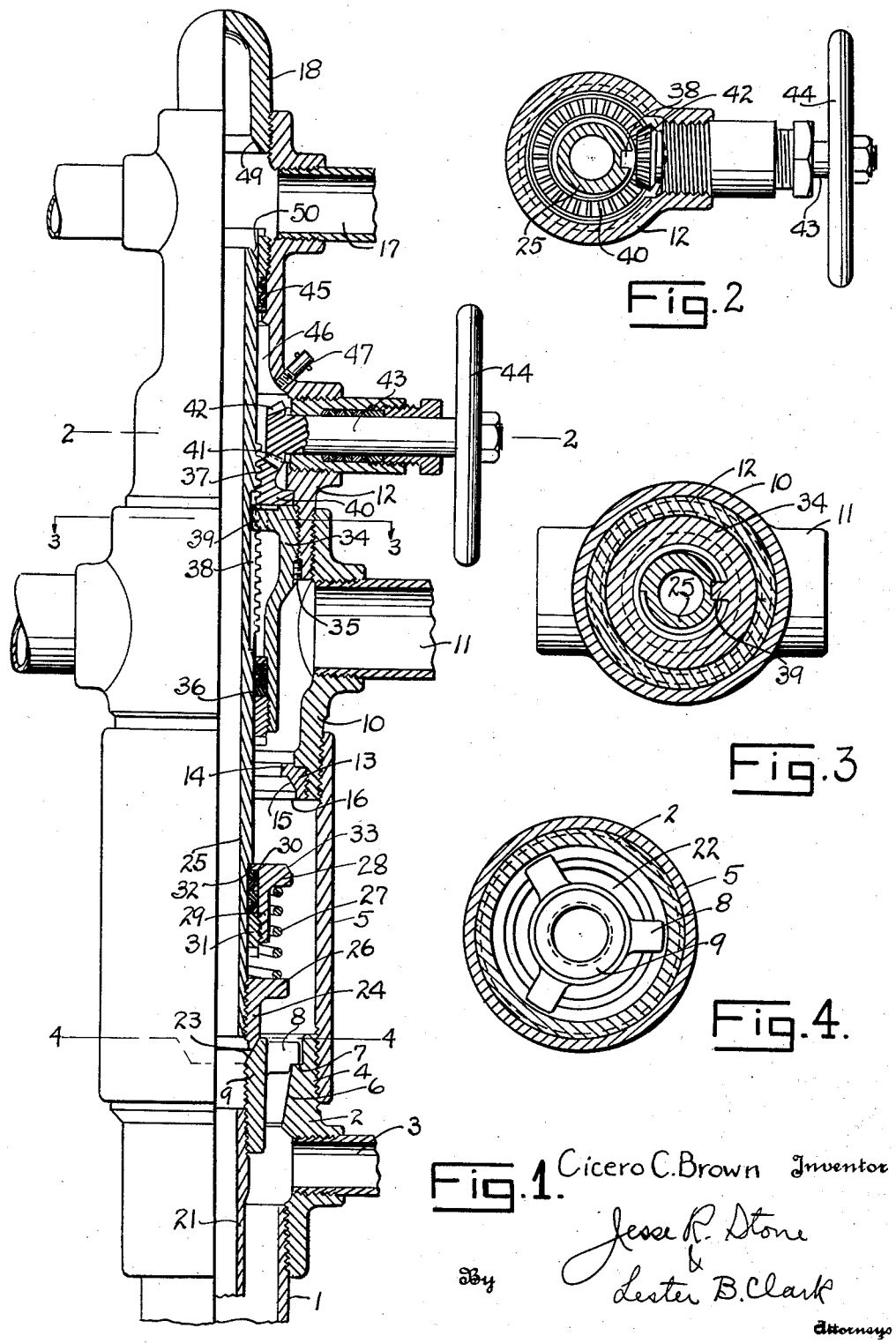
Fig. 2 is a transverse section on the plane 2—2 of Fig. 1.
Fig. 3 is a similar section on the plane 3—3 of Fig. 1.
Fig. 4 is a transverse section on the plane 4—4 of Fig. 1.

My device is intended for connection at the upper end of the well casing 1. I provide a casing head 2 having a lateral outlet 3 connected therewith, the upper end of the casing head being threaded at 4 for connection with a nipple 5. The interior of the casing head is formed with a tapered seat 6 at the upper portion of which is a shoulder 7, upon which may be supported the arms 8 of my tubing hanger 9.

At the upper end of the nipple 5 and spaced a predetermined distance from the casing head is a supplementary head 10. Said head has a plurality of flow pipes 11 connected therewith and the upper end is threaded to receive a fitting 12.

At the lower end of the supplementary head 10 I screw a valve ring 13. This ring has an inwardly extending flange 14 at the upper end thereof, below which is a valve seat 15 merging into a cylindrical lower end 16 on the ring. It will thus be seen that the tapered seat 15 is away from the main line of flow of liquid through the valve ring, thus being protected from erosion in the passage of fluid therethrough.

Figure 5:
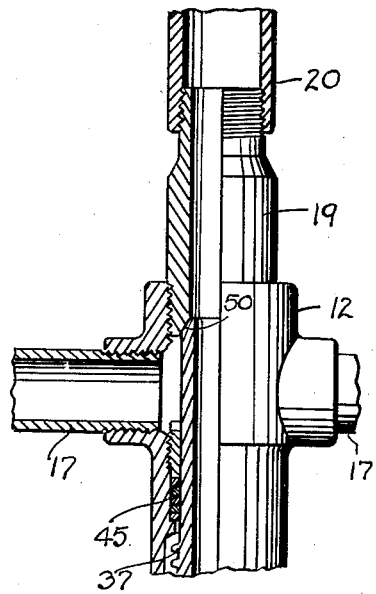
Fig. 5 is a broken side view partly in vertical section illustrating a modified form of equipment which may be employed at the upper end of the flow head.

The fitting 12 is reduced in diameter toward its upper end and has a plurality of outlets 17 thereon which form the usual Christmas tree or flow lines from the upper end of the tubing. The upper end of the fitting 12 may be closed by a bull plug 18, or, as shown in Fig. 5, may have a nipple 19 thereon by means of which it may be connected to a flow pipe 20.

Within the well head thus constructed is the tubing which conducts the main portion of the fluid flow from the well. The upper end of the main well tubing is shown at 21. It is supported in the casing head by means of the hanger 9. This hanger is materially smaller in diameter than the passage through the casing so that the fluid may find space around the same to move upwardly into the nipple 5. The arms 8 on the hanger are shown as three in number, as will be observed in Fig. 4, thus providing space shown at 22 between them for the fluid to pass. The interior of the hanger at the upper end is tapered downwardly at 23 to provide a seat into which the head 24 on the tubing extension may fit. The head 24 is tapered at its lower end to conform to the taper of the seat and its upper end is provided with a radial flange 26 to support a spring 27.

The spring 27 bears at its upper end against a flange 28 upon a valve member 29. Said valve member forms a sleeve about the tubing extension 25 and is slidable thereon. A seal is made between the valve member and the extension through means of packing 30 and gland 31, screwed within the lower end of the valve. The valve is limited in its upward movement on the extension by means of a shoulder 32 on said extension. The upper margin of the flange 28 is beveled at 33 to fit the valve seat 15 when the extension 25 is moved upwardly.

Above the valve 29 is a bushing 34, which is threaded at its upper end to engage within the lower end of the fitting 12. It may be held against unscrewing therefrom by means of a set screw 35. The lower end of the bushing 34 forms a seal with the outer surface of the tubing extension by means of a stuffing box shown at 36. The tubing extension is formed with a coarse thread 37 thereon and a longitudinal key-way 38 is formed along one side of the threaded area to receive a key 39 formed on the upper end of the bushing 34. Thus the tubing extension is held against rotation but is allowed a longitudinal sliding movement within the bushing 34.

The upper end of the bushing 34 serves as the seat for a nut 40 threaded onto the threaded surface 37 of the tubing extension. The upper end of the nut is geared at 41 to the drive pinion 42, formed upon the shaft 43 extending through the side of the bushing 12 in a radial direction and having a hand wheel 44 thereon. Thus it will be seen that the rotation of the shaft 43 will rotate the nut 40 and screw the tubing extension longitudinally in the flow head. I form a seal at 45 between the upper end of the fitting 12 and the tubing extension so as to provide a closed chamber 46 to contain lubricant fed thereto through the grease gun connection 47.

The bull plug 18 is formed with a valve seat 49 at its lower end and the upper end of the tubing extension is tapered at 50 to fit said seat, so that when said extension is raised to bring the tapered end 50 to the seat 49 the lateral outlet 17 will be closed.

Figure 7:
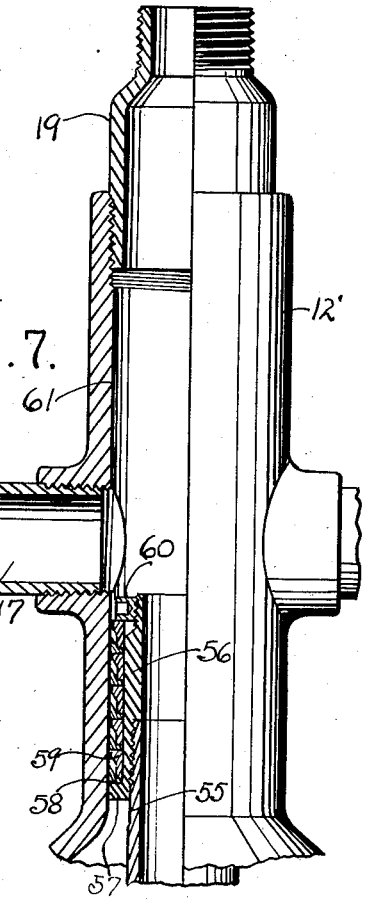
Fig. 7 is a view similar to Fig. 6 but disclosing a somewhat different form thereof.

It is unnecessary to provide a seat as shown at 50 in Fig. 5 to form a seal between the upper end of the tubing extension and the nipple 19 and, in Fig. 7, I have illustrated another form which may be employed.

In this embodiment the upper end 55 of the tubing extension is connected with a packing member comprising a sleeve 56, the lower end of which has an oppositely extending flange 57 thereon forming a seat for packing cups 58 and spacing rings 59. The cups are clamped between the spacing members and any suitable number of cups and spacers may be employed. At the upper end of the sleeve 56 is screwed a clamping ring 60 which clamps the packing members rigidly upon the sleeve. The packing members are adapted to contact closely with the interior wall 61 of the fitting 12'. It will be noted that in this embodiment the fitting is extended upwardly beyond the lateral outlets 17 to provide sufficient space to receive the packing member at the upper end of the extension.

In this embodiment the packing will form a seal with the inner wall of the fitting and will cut off the passage of fluid laterally into the pipes 17. It will be possible to allow the flow upwardly from the nipple 19 to some other flow line if desired, or, as previously noted, the upper end may be closed by a cap or plug. The operation of this device will be similar to that disclosed in the Fig. 5 embodiment.

In the operation of this device the flow of fluid from the well under ordinary circumstances will be through the tubing 21 and the tubing extension 25 to the flow lines 17. There may be a flow also through the casing and from the outlets 3 or 11. There is usually a certain amount of gas under pressure within the casing even if liquid is not flowing therefrom. When it is desired to make repairs upon the lines 11 from the casing the shaft 43 is rotated to screw the extension 25 upwardly. When this is done the valve 29 will be brought to its seat in the ring 13 so as to close the outlet leading to the flow lines 11. If it is also desired that the flow lines 17 be closed, the extension is raised still further to bring the upper end thereof into the seat 40. When this is done the valve 29 will be moved downwardly on the extension 25 against the action of the spring 27, thus allowing both the valves 29 and the tapered end 50 to come to a closing position.

The manner in which the valve 29 is mounted resiliently upon the tubing extension 25 will allow the effective seating of the valve and the tubing extension so that a close seal is made in both cases. Without this provision, the simultaneous seating of the two valves would be impossible. Furthermore, this allows for the closing, first, of the flow lines 11 without closing the line 17, but a further movement of the tubing extension will close both outlets, thus permitting any repairs whatever to be made on the flow lines without killing the well. The device is simple in construction and economical to manufacture and may be furnished to the trade at a price within the reach of the ordinary operator.

Figure 6:
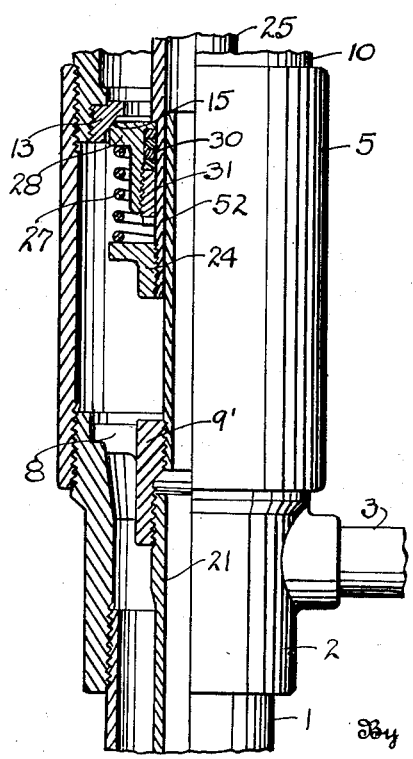
Fig. 6 is a broken side view in vertical section illustrating a modified form of equipment of the lower portion of the flow head.

In Fig. 6 I have shown an arrangement whereby the disconnection of the tubing extension 25 from the upper end of the tubing may be avoided. In doing this I provide on the hanger 9' an upwardly extending nipple 52, which has a close sliding fit with the interior of the tubing extension 25. The said extension may thus move longitudinally along the outer surface of the nipple 52 without leakage of fluid between the two tubes. The equipment is otherwise the same as that shown in the first embodiment. I do not wish to be restricted to the use of any particular means of maintaining a closure between the tubing extension and the tube during the flowing of oil.

What I claim as new is:

1. A well control apparatus including a well casing, a casing head thereon, a well tubing suspended in said casing head, an upward extension for said tubing adapted to form a seal with the upper end of said tubing, means connected with said casing head to entirely enclose the said upward extension, outlets from said casing, outlets from the tubing extension at its upper end, means to move said extension, and means on said extension to close said casing outlets and said extension outlets when said extension is moved upwardly.

2. A well control apparatus including a well casing, a casing head thereon, a well tubing suspended in said casing head, an upward extension for said tubing adapted to form a seal with the upper end of said tubing, means connected with said casing head to enclose the said upward extension, outlets from said casing, outlets from the tubing extension at its upper end, means to move said extension, and means on said extension to close said casing outlets first and, on further movement, to close said extension outlets.

3. A well control apparatus including a well casing, a casing head, a tubing suspended in said casing head, a supplementary casing head spaced above said casing head, a fitting on said supplementary casing head, flow lines from said supplementary head, flow lines from said fitting, a tubing extension slidable in said heads and said fitting, means to move said extension longitudinally, and valve members on said extension and supported resiliently thereon to close off said supplementary casing head outlets, when said extension is moved upwardly.

4. A well control apparatus including a well casing, a casing head, a tubing suspended in said casing head, a supplementary casing head spaced above said casing head, a fitting on said supplementary casing head, flow lines from said supplementary head, flow lines from said fitting, a tubing extension slidable in said heads and said fitting, means to move said extension longitudinally, and valve members on said extension and supported resiliently thereon to close off said supplementary casing head outlets, when said extension is moved upwardly, said extension being movable after said valve member is closed, to close off said outlets from said fitting.

5. A well control including a well casing a tubing support at the upper end thereof, a casing head spaced above said support, lateral outlets from said casing head, a fitting on said head extending above said head, lateral flow outlets from the upper end of said fitting, a separable extension on the upper end of said tubing slidable within said casing head and said fitting, means to move said extension, a valve seat in said casing head, and a valve resiliently mounted on said tubing extension adapted to engage said seat when said extension is moved upwardly to close off the passage of fluid to said casing head outlets, the upper end of said extension being adapted to also close off the lateral outlets from said fitting.

6. A well control device including a well casing, a tubing support in said casing, a tubing supported therein, a supplementary head spaced above said support, lateral outlets from said head, a fitting above said supplementary head, lateral flow lines connected with said fitting, a tubing extension slidable in said casing head and fitting and having a fluid tight fit within said fitting, means in said fitting to move said extension, means to enclose lubricant about said extension moving means, and means on said extension to close said outlets.

7. A casing, a structure on said casing extending upwardly and having therein upper and lower flow outlets, a tubing in said casing, a longitudinally slidable extension for said tubing enclosed within said structure, means to move said extension, and means on said extension to close both said flow outlets when said extension is moved upwardly.

8. A casing, a structure on said casing extending upwardly and having therein upper and lower flow outlets, a tubing in said casing, a longitudinally slidable extension for said tubing enclosed within said structure, means to move said extension, and means on said extension to close both said flow outlets when said extension is moved upwardly, said lower flow outlets being closeable while said upper outlets are still open.

In testimony whereof I hereunto affix my signature this 15th day of February A. D. 1932.

CICERO C. BROWN.